(12) United States Patent
Kondo et al.

(10) Patent No.: US 11,965,601 B2
(45) Date of Patent: Apr. 23, 2024

(54) FLOW PATH SWITCHING VALVE

(71) Applicant: FUJIKOKI CORPORATION, Tokyo (JP)

(72) Inventors: Daisuke Kondo, Tokyo (JP); Kenichi Mochizuki, Tokyo (JP); Satoshi Goto, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 17/597,965

(22) PCT Filed: Jun. 25, 2020

(86) PCT No.: PCT/JP2020/025106
§ 371 (c)(1),
(2) Date: Jan. 31, 2022

(87) PCT Pub. No.: WO2021/024641
PCT Pub. Date: Feb. 11, 2021

(65) Prior Publication Data
US 2022/0170555 A1    Jun. 2, 2022

(30) Foreign Application Priority Data
Aug. 2, 2019  (JP) .................................. 2019-142829

(51) Int. Cl.
*F16K 1/44* (2006.01)
*F16K 11/048* (2006.01)
*F16K 31/04* (2006.01)

(52) U.S. Cl.
CPC .............. *F16K 1/44* (2013.01); *F16K 11/048* (2013.01); *F16K 31/04* (2013.01)

(58) Field of Classification Search
CPC ........... F16K 1/44; F16K 11/048; F16K 31/04
See application file for complete search history.

(56) References Cited

U.S. PATENT DOCUMENTS 2,601,989 A * 7/1952 Modes ................. F16K 11/048
251/282
3,805,837 A * 4/1974 Stampfli ............... F16K 11/048
137/625.6
(Continued)

FOREIGN PATENT DOCUMENTS

DE         1025693 B     3/1958
JP        S52-35541 Y2   8/1977
(Continued)

OTHER PUBLICATIONS

PCT, International Search Report for the corresponding application No. PCT/JP2020/025106, dated Aug. 4, 2020, with English translation.
(Continued)

*Primary Examiner* — Craig M Schneider
*Assistant Examiner* — Christopher D Ballman
(74) *Attorney, Agent, or Firm* — Lucas & Mercanti, LLP

(57) ABSTRACT

In a flow path switching valve, when a valve rod is shifted toward a first back pressure chamber, a first valve chamber is separated from the first back pressure chamber by a first valve element, and a second valve chamber is separated from an intermediate chamber by a second valve element. When the valve rod is shifted toward a second back pressure chamber, the first valve chamber is separated from the intermediate chamber by the first valve element, and the second valve chamber is separated from the second back pressure chamber by the second valve element. The valve rod has a pressure equalizing path through which the first back pressure chamber and the second back pressure chamber are connected.

4 Claims, 4 Drawing Sheets

(56) References Cited

U.S. PATENT DOCUMENTS

| | | | | |
|---|---|---|---|---|
| 4,574,844 | A * | 3/1986 | Neff | F16K 11/044 |
| | | | | 137/884 |
| 4,754,776 | A * | 7/1988 | McKee | F16K 11/044 |
| | | | | 92/49 |
| 4,924,911 | A * | 5/1990 | Schmalenbach | F16K 11/048 |
| | | | | 137/625.5 |
| 5,261,442 | A * | 11/1993 | Kingsford | F16K 31/1262 |
| | | | | 137/625.5 |
| 9,260,844 | B2 * | 2/2016 | Peel | E03C 1/055 |
| 9,285,051 | B2 * | 3/2016 | Hirota | F16K 11/10 |
| 9,371,920 | B2 * | 6/2016 | Coates, III | F16K 31/04 |
| 9,429,242 | B2 * | 8/2016 | Becker | F16K 11/0704 |
| 9,841,112 | B2 * | 12/2017 | Bakker | F16K 11/048 |
| 10,208,873 | B2 * | 2/2019 | Frippiat | F16K 11/048 |
| 2014/0311586 | A1 | 10/2014 | Becker | |
| 2015/0377368 | A1 | 12/2015 | Coates, III et al. | |
| 2019/0250645 | A1 | 8/2019 | Kanamori et al. | |

FOREIGN PATENT DOCUMENTS

| | | |
|---|---|---|
| JP | S62-112378 U | 7/1987 |
| JP | 2011-094768 A | 5/2011 |
| JP | 2016-089931 A | 5/2016 |
| JP | 2017-133641 A | 8/2017 |
| JP | 2019-138393 A | 8/2019 |

OTHER PUBLICATIONS

PCT, Written Opinion for the corresponding application No. PCT/JP2020/025106, dated Aug. 4, 2020, with English translation.
Extended European Search Report dated Jul. 25, 2023 for the corresponding application No. 20849683.6.
Office Action dated Aug. 21, 2023 for the corresponding Chinese Application No. 202080051580.0, with English translation.

\* cited by examiner

FLOW PATH SWITCHING VALVE

TECHNICAL FIELD

The present invention relates to a flow path switching valve.

BACKGROUND ART

Patent Literature 1 discloses a flow path switching valve of the related art. The flow path switching valve includes a substantially cylindrical body as a valve body. The body has a first inflow port, a second inflow port, and an outflow port. The body has a first flow path through which a fluid flows between the first inflow port and the outflow port. In the first flow path, a first valve seat is disposed. The body has a second flow path through which a fluid flows between the second inflow port and the outflow port. In the second flow path, a second valve seat is disposed. In the body, a pushrod is disposed in an axial direction. A first valve element and a second valve element are attached to the pushrod. When the pushrod is shifted in one direction, the second valve element is in contact with the second valve seat and the second flow path is closed, and the first valve element is separated from the first valve seat and the first flow path is opened. When the push rod is shifted in the other direction, the first valve element is in contact with the first valve seat and the first flow path is closed, and the second valve element is separated from the second valve seat and the second flow path is opened.

CITATION LIST

Patent Literature

Patent Literature 1: Japanese Unexamined Patent Application Publication No. 2016-89931

SUMMARY OF INVENTION

Technical Problem

In the flow path switching valve of the related art described above, in the state in which the first flow path is opened and the second flow path is closed, the fluid in the second inflow port applies a force to the second valve element. The force pushes the second valve element toward the second valve seat. Thus, when the second valve element is separated from the second valve seat to open the second flow path, a large force is required to shift the pushrod. In the state in which the second flow path is opened and the first flow path is closed, when the first valve element is separated from the first valve seat to open the first flow path, a large force is required to shift the pushrod. Thus, the flow path switching valve requires a drive unit that is able to apply the large force to the pushrod to shift it.

Accordingly, it is an object of the present invention to provide a flow path switching valve that can switch flow paths with a small force.

Solution to Problem

To achieve the object described above, a flow path switching valve according to the present invention includes a valve body in a cylindrical shape, a valve rod disposed in the valve body in an axial direction, a first valve element attached to the valve rod, and a second valve element attached to the valve rod. The valve body includes a first back pressure chamber, a first valve chamber, an intermediate chamber, a second valve chamber, and a second back pressure chamber in sequence in the axial direction. The valve body includes a first flow path connected to the first valve chamber, a second flow path connected to the second valve chamber, and a third flow path connected to the intermediate chamber. The first valve element is disposed in the first valve chamber. The second valve element is disposed in the second valve chamber. When the valve rod is shifted toward the first back pressure chamber, the first valve chamber communicates with the intermediate chamber, the first valve chamber is separated from the first back pressure chamber by the first valve element, the second valve chamber communicates with the second back pressure chamber, and the second valve chamber is separated from the intermediate chamber by the second valve element. When the valve rod is shifted toward the second back pressure chamber, the first valve chamber communicates with the first back pressure chamber, the first valve chamber is separated from the intermediate chamber by the first valve element, the second valve chamber communicates with the intermediate chamber, and the second valve chamber is separated from the second back pressure chamber by the second valve element. The valve body or the valve rod has a pressure equalizing path through which the first back pressure chamber and the second back pressure chamber are connected.

According to the present invention, when the valve rod is shifted toward the first back pressure chamber, the first valve chamber communicates with the intermediate chamber, the first valve chamber is separated from the first back pressure chamber by the first valve element, the second valve chamber communicates with the second back pressure chamber, and the second valve chamber is separated from the intermediate chamber by the second valve element. The valve body or the valve rod has the pressure equalizing path through which the first back pressure chamber and the second back pressure chamber are connected. Accordingly, pressure of a fluid in the second flow path is applied to a surface, which faces the first back pressure chamber, of the first valve element and a surface, which faces the second back pressure chamber of the second valve element. The pressure applied to the surface of the first valve element and the pressure applied to the surface of the second valve element can be canceled. When the valve rod is shifted toward the second back pressure chamber, the first valve chamber communicates with the first back pressure chamber, the first valve chamber is separated from the intermediate chamber by the first valve element, the second valve chamber communicates with the intermediate chamber, and the second valve chamber is separated from the second back pressure chamber by the second valve element. The valve body or the valve rod has the pressure equalizing path through which the first back pressure chamber and the second back pressure chamber are connected. Accordingly, pressure of a fluid in the first flow path is applied to the surface, which faces the first back pressure chamber, of the first valve element and the surface, which faces the second back pressure chamber of the second valve element. The pressure applied to the surface of the first valve element and the pressure applied to the surface of the second valve element can be canceled. Thus, a force required to shift the valve rod can be small.

Advantageous Effects of Invention

According to the present invention, it is possible to switch the flow paths with a small force.

DESCRIPTION OF EMBODIMENTS

A flow path switching valve according to an embodiment of the present invention is described with reference to FIG. 1 to FIG. 4.

Figure 1:
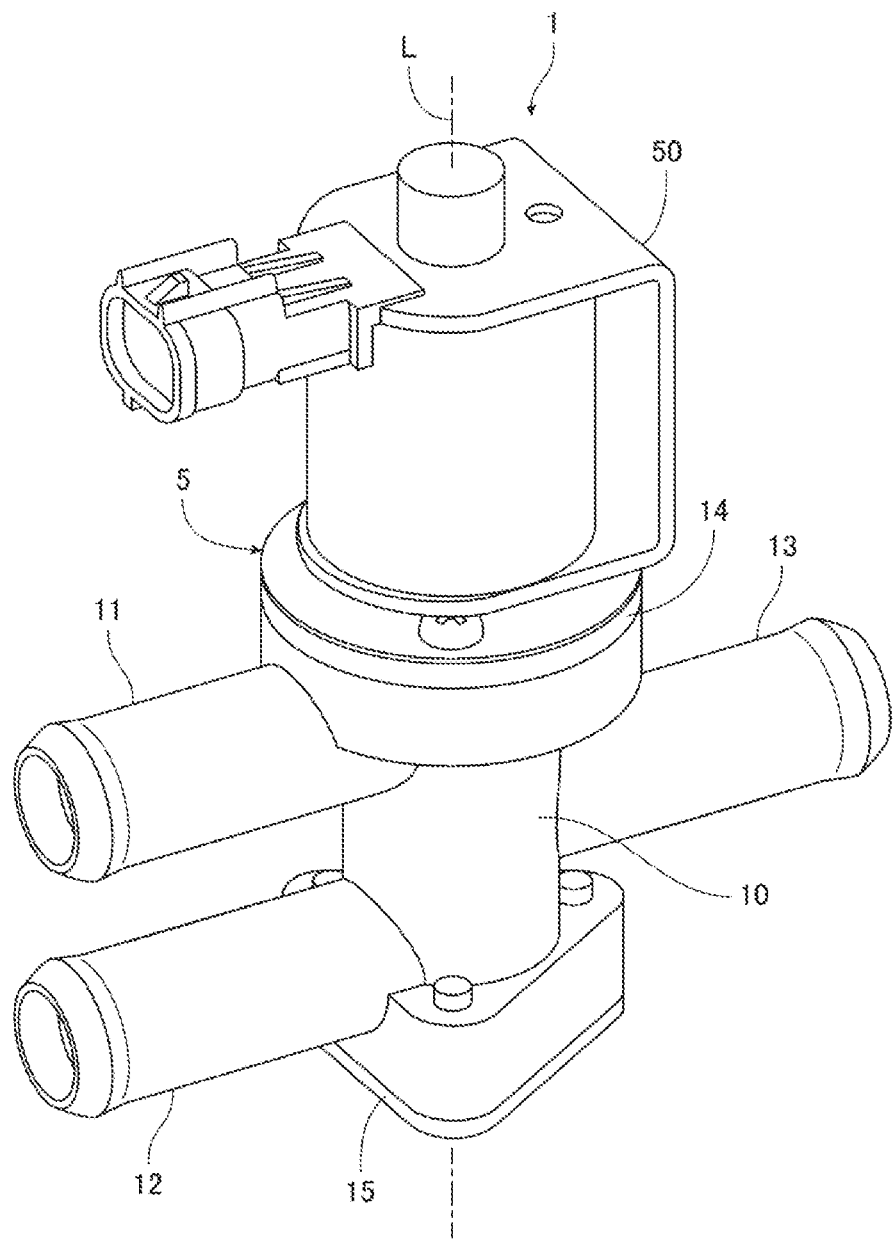
FIG. 1 is a perspective view of a flow path switching valve according to an embodiment of the present invention.
Figure 2:
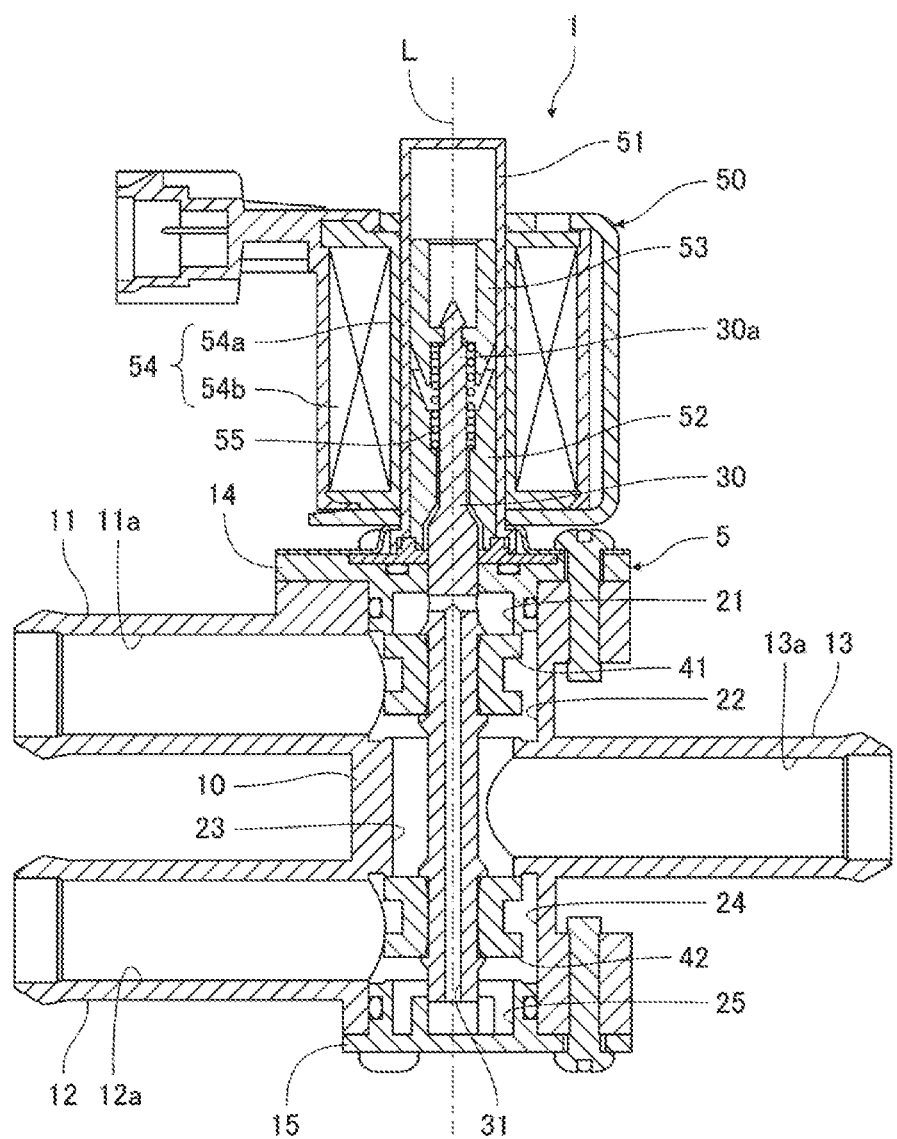
FIG. 2 is a longitudinal sectional view of the flow path switching valve in FIG. 1.
Figure 3:
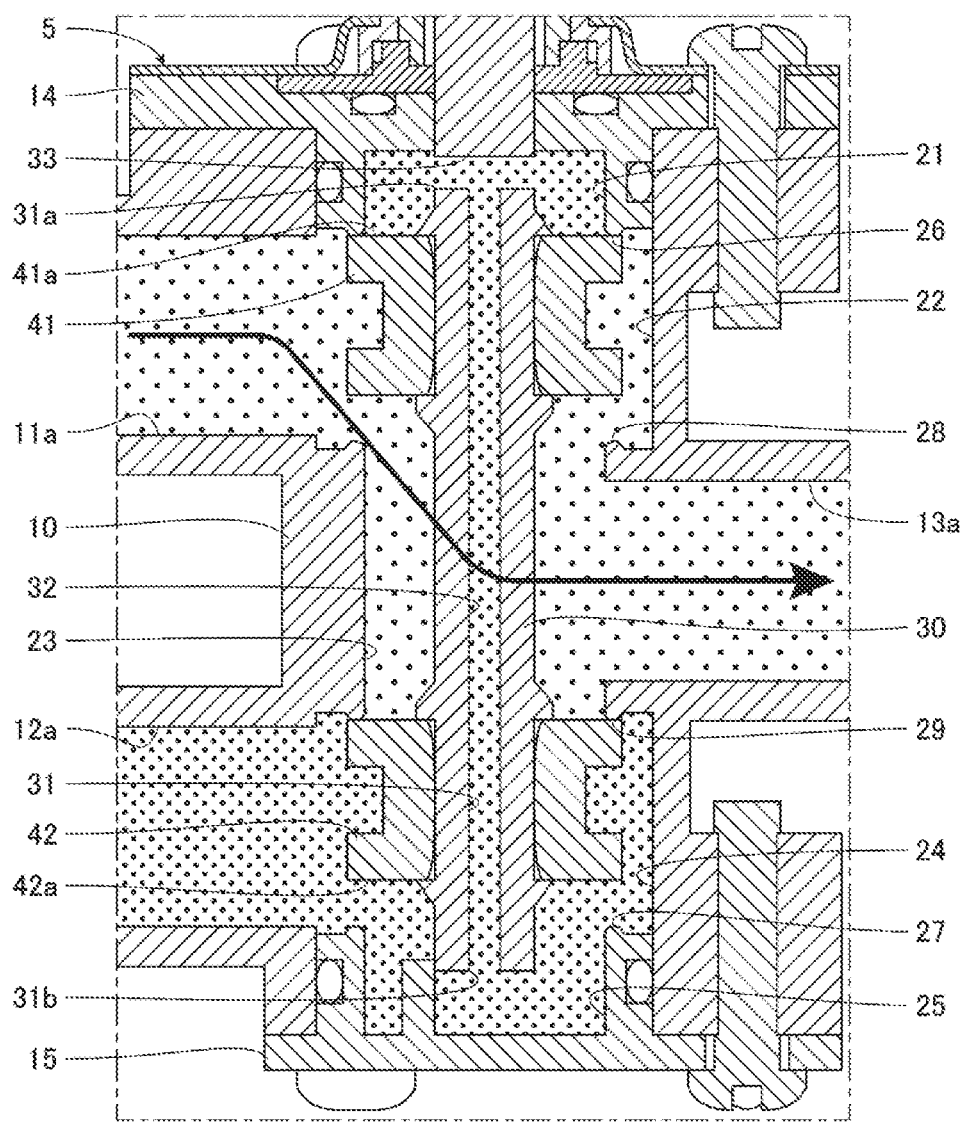
FIG. 3 is an enlarged sectional view of a valve element and elements in its vicinity that are included in the flow path switching valve in FIG. 1.
Figure 4:
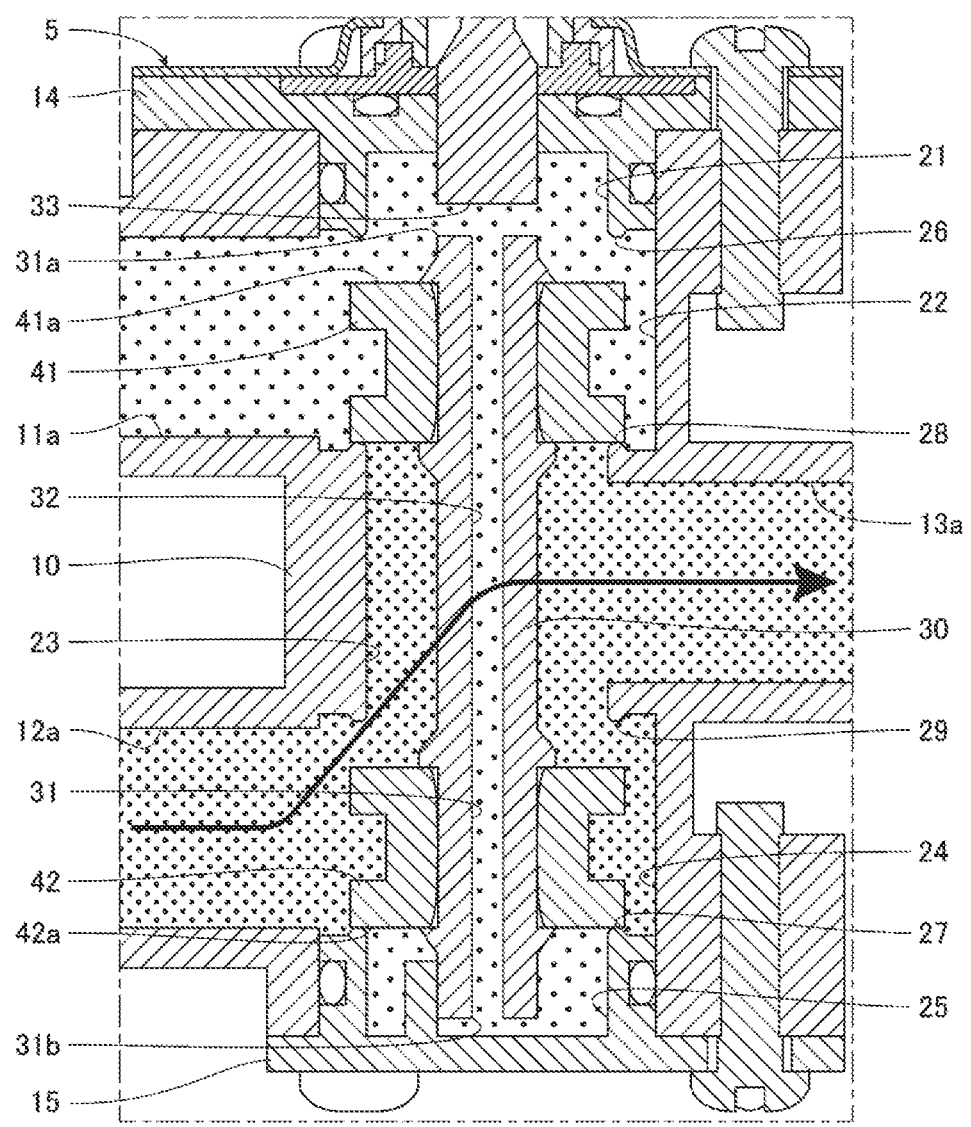
FIG. 4 is an enlarged sectional view of the valve element and the elements in its vicinity that are included in the flow path switching valve in FIG. 1 in a different state.

FIG. 1 is a perspective view of the flow path switching valve according to an embodiment of the present invention and FIG. 2 is a sectional view thereof. The sectional view is a longitudinal sectional view taken in an axial direction. FIG. 3 and FIG. 4 are enlarged sectional views of a valve element and elements in its vicinity that are included in the flow path switching valve in FIG. 1. FIG. 3 illustrates a state in which a first flow path and a third flow path are connected to each other. FIG. 4 illustrates a state in which a second flow path and the third flow path are connected to each other.

As illustrated in FIG. 1 to FIG. 4, a flow path switching valve 1 of the present embodiment is a three-way switching valve. The flow path switching valve 1 includes a valve body 5, a valve rod 30, a first valve element 41, a second valve element 42, and a drive unit 50.

The valve body 5 includes a valve housing 10 and lid members 14, 15.

The valve housing 10 has a substantially cylindrical shape. The valve housing 10 has a first tubular portion 11, a second tubular portion 12, and a third tubular portion 13. The first tubular portion 11, the second tubular portion 12, and the third tubular portion 13 extend in directions perpendicular to an axis L direction. The first tubular portion 11 and the second tubular portion 12 are disposed side by side so as to be apart from each other in the axis L direction. The first tubular portion 11 and the second tubular portion 12 extend in the same direction (left direction in FIG. 1 and FIG. 2). The third tubular portion 13 is disposed between the first tubular portion 11 and the second tubular portion 12 with respect to the axis L direction. The third tubular portion 13 extends in a direction (right direction in FIG. 1 and FIG. 2) opposite to the direction in which the first tubular portion 11 and the second tubular portion 12 extend. The first tubular portion 11 has a first flow path 11a inside thereof. The second tubular portion 12 has a second flow path 12a inside thereof. The third tubular portion 13 has a third flow path 13a inside thereof.

In the present embodiment, the flow path switching valve 1 is used so that a fluid flows into the first flow path 11a and the second flow path 12a and the fluid flows out of the third flow path 13a. Alternatively, the flow path switching valve 1 may be used so that a fluid flows into the third flow path 13a and the fluid flows out of the first flow path 11a or the second flow path 12a.

The lid member 14 is attached to the valve housing 10 so as to close an upper end opening of the valve housing 10. The lid member 15 is attached to the valve housing 10 so as to close a lower end opening of the valve housing 10.

The valve body 5 includes a first back pressure chamber 21, a first valve chamber 22, an intermediate chamber 23, a second valve chamber 24, and a second back pressure chamber 25 in sequence from the upper side to the lower side of the valve body 5 in the axis L direction.

The first flow path 11a is connected to the first valve chamber 22. The third flow path 13a is connected to the intermediate chamber 23. The second flow path 12a is connected to the second valve chamber 24.

The first back pressure chamber 21 is open to the first valve chamber 22. The second back pressure chamber 25 is open to the second valve chamber 24. The intermediate chamber 23 is open to the first valve chamber 22 and the second valve chamber 24.

The valve housing 10 has a first back pressure chamber side valve seat 26, a second back pressure chamber side valve seat 27, a first valve seat 28, and a second valve seat 29. Each of the valve seats has an annular shape. The first back pressure chamber side valve seat 26 surrounds an opening of the first back pressure chamber 21. The second back pressure chamber side valve seat 27 surrounds an opening of the second back pressure chamber 25. The first valve seat 28 surrounds an opening on the first valve chamber 22 side of the intermediate chamber 23. The second valve seat 29 surrounds an opening on the second valve chamber 24 side of the intermediate chamber 23.

The valve rod 30 is disposed in the valve body 5 in the axis L direction. An axis of the valve housing 10 and an axis of the valve rod 30 coincide with the axis L. The valve rod 30 is supported so as to be shiftable in the axis L direction by the lid members 14, 15. An upper end portion 30a of the valve rod 30 passes through the lid member 14 and projects upward. A plunger 53 of the drive unit 50 is attached to the upper end portion 30a.

The valve rod 30 has a pressure equalizing path 31. The pressure equalizing path 31 has a longitudinal path 32 and a transverse path 33. The longitudinal path 32 extends in the valve rod 30 in the axis L direction. The transverse path 33 is disposed continuously at an upper end of the longitudinal path 32 and extends in a direction perpendicular to the axis L direction. The pressure equalizing path 31 has a first end 31a open to the first back pressure chamber 21. The pressure equalizing path 31 has a second end 31b open to the second back pressure chamber 25. The first back pressure chamber 21 and the second back pressure chamber 25 are connected through the pressure equalizing path 31. Having the pressure equalizing path 31 in the valve rod 30 enables the flow path switching valve 1 to be smaller. Instead of the pressure equalizing path 31 of the valve rod 30, a pressure equalizing path through which the first back pressure chamber 21 and the second back pressure chamber 25 are connected may be disposed in the valve body 5.

The first valve element 41 and the second valve element 42 each have a cylindrical shape. The first valve element 41 has flange portions projecting outward at both ends. The second valve element 42 has flange portions projecting outward at both ends. The first valve element 41 and the second valve element 42 are fixed to the valve rod 30. The valve rod 30 extends through the first valve element 41 and the second valve element 42. The first valve element 41 is disposed in the first valve chamber 22. The second valve element 42 is disposed in the second valve chamber. The first valve element 41 and the second valve element 42 are made of, for example, a synthetic resin or a rubber material. Accordingly, loud noises when the first valve element 41 and the second valve element 42 come into contact with the respective valve seats can be reduced.

The first valve element 41 is in contact with and separated from the first valve seat 28, and thus the first valve chamber 22 is separated from and communicates with the intermediate chamber 23. That is, the first valve element 41 opens and closes the opening on the first valve chamber 22 side of the intermediate chamber 23. The first valve element 41 is in contact with and separated from the first back pressure chamber side valve seat 26, and thus the first valve chamber 22 is separated from and communicates with the first back pressure chamber 21. That is, the first valve element 41 opens and closes the opening of the first back pressure chamber 21. The second valve element 42 is in contact with and separated from the second valve seat 29, and thus the second valve chamber 24 is separated from and communicates with the intermediate chamber 23. That is, the second valve element 42 opens and closes the opening on the second valve chamber 24 side of the intermediate chamber 23. The second valve element 42 is in contact with and separated from the second back pressure chamber side valve seat 27, and thus the second valve chamber 24 is separated from and communicates with the second back pressure chamber 25. That is, the second valve element 42 opens and closes the opening of the second back pressure chamber 25.

In the present embodiment, the area of the opening of the first back pressure chamber 21 is the same as the area of the opening on the second valve chamber 24 side of the intermediate chamber 23. The area of the opening of the second back pressure chamber 25 is the same as the area of the opening on the first valve chamber 22 side of the intermediate chamber 23. With this configuration, pressure of the fluid can be canceled more appropriately, and a force required to shift the valve rod 30 can be smaller.

The drive unit 50 is an electromagnetic actuator. The drive unit 50 is disposed above the valve body 5. The drive unit 50 has a can 51, an attractor 52, the plunger 53, a coil member 54, and a compression coil spring 55. Alternatively, the drive unit 50 may be a unit with an electric motor to shift the valve rod 30 in the axis L direction.

The can 51 has a cylindrical shape with its upper end portion closed. The can 51 has a lower end portion attached to the lid member 14 of the valve body 5. The attractor 52 has a cylindrical shape. The attractor 52 is fixed inside the can 51. The upper end portion 30a of the valve rod 30 extends through the attractor 52. The plunger 53 has a cylindrical shape. The plunger 53 is disposed above the attractor 52 inside the can 51. The plunger 53 is fixed to the upper end portion 30a of the valve rod 30. The compression coil spring 55 is disposed between the attractor 52 and the plunger 53. The compression coil spring 55 applies a force to the plunger 53 and the attractor 52 in a direction separating the plunger 53 and the attractor 52 from each other. The coil member 54 has a substantially cylindrical shape. The coil member 54 has a bobbin 54a and a coil 54b having wires wound around the bobbin 54a. The coil member 54 is fixed to the can 51. The can 51 extends through the coil member 54.

Next, an example of the operation of the flow path switching valve 1 is described with reference to FIG. 3 and FIG. 4. In FIG. 3 and FIG. 4, the fluids flowing through the paths are schematically indicated as dots. The region where the dot density is low indicates the fluid flowing into the first flow path 11a. The region where the dot density is high indicates the fluid flowing into the second path 11b. In FIG. 3 and FIG. 4, bold arrows schematically indicate fluid flow.

As illustrated in FIG. 3, in a state in which the coil member 54 of the drive unit 50 is not energized, the plunger 53 is shifted upward by the compression coil spring 55, and the valve rod 30 is shifted toward the first back pressure chamber 21 in the axis L direction. In this state, the first valve element 41 is separated from the first valve seat 28 and is in contact with the first back pressure chamber side valve seat 26. Accordingly, the first valve chamber 22 communicates with the intermediate chamber 23, and the first valve chamber 22 is separated from the first back pressure chamber 21 by the first valve element 41. The second valve element 42 is separated from the second back pressure chamber side valve seat 27 and is in contact with the second valve seat 29. Accordingly, the second valve chamber 24 communicates with the second back pressure chamber 25, and the second valve chamber 24 is separated from the intermediate chamber 23 by the second valve element 42.

In the state illustrated in FIG. 3, the first flow path 11a and the third flow path 13a are connected to each other via the first valve chamber 22 and the intermediate chamber 23. The fluid flowing into the first flow path 11a flows out of the third flow path 13a. Then, the fluid flowing into the second flow path 12a is placed in the first back pressure chamber 21 via the second valve chamber 24, the second back pressure chamber 25, and the pressure equalizing path 31. Accordingly, pressure of the fluid flowing into the second flow path 12a is applied to a surface 41a, which faces the first back pressure chamber 21, of the first valve element 41 and a surface 42a, which faces the second back pressure chamber 25, of the second valve element 42. The direction of the pressure applied to the surface 41a and the direction of the pressure applied to the surface 42a are opposite to each other. Thus, the pressures applied to the surface 41a and the surface 42a in the axis L direction by the fluid flowing into the second flow path 12a are canceled.

As illustrated in FIG. 4, in a state in which the coil member 54 of the drive unit 50 is energized, the plunger 53 is attracted to the magnetized attractor 52 and is shifted downward, and the valve rod 30 is shifted toward the second back pressure chamber 25 in the axis L direction. In this state, the first valve element 41 is separated from the first back pressure chamber side valve seat 26 and is in contact with the first valve seat 28. Accordingly, the first valve chamber 22 communicates with the first back pressure chamber 21, and the first valve chamber 22 is separated from the intermediate chamber 23 by the first valve element 41. The second valve element 42 is separated from the second valve seat 29 and is in contact with the second back pressure chamber side valve seat 27. Accordingly, the second valve chamber 24 communicates with the intermediate chamber 23, and the second valve chamber 24 is separated from the second back pressure chamber 25 by the second valve element 42.

In the state illustrated in FIG. 4, the second flow path 12a and the third flow path 13a are connected to each other via the second valve chamber 24 and the intermediate chamber 23. The fluid flowing into the second flow path 12a flows out of the third flow path 13a. Then, the fluid flowing into the first flow path 11a is placed in the second back pressure chamber 25 via the first valve chamber 22, the first back pressure chamber 21, and the pressure equalizing path 31. Accordingly, pressure of the fluid flowing into the first flow path 11a is applied to the surface 41a, which faces the first back pressure chamber 21, of the first valve element 41 and the surface 42a, which faces the second back pressure chamber 25, of the second valve element 42. The direction of the pressure applied to the surface 41a and the direction of the pressure applied to the surface 42a are opposite to each other. Thus, the pressures applied to the surface 41a and the surface 42a in the axis L direction by the fluid flowing into the first flow path 11a are canceled.

As described above, according to the flow path switching valve 1 of the present embodiment, when the valve rod 30 is shifted toward the first back pressure chamber 21, the first valve chamber 22 communicates with the intermediate chamber 23, the first valve chamber 22 is separated from the first back pressure chamber 21 by the first valve element 41, the second valve chamber 24 communicates with the second back pressure chamber 25, and the second valve chamber 24 is separated from the intermediate chamber 23 by the second valve element 42. The valve rod 30 has the pressure equalizing path 31 through which the first back pressure chamber 21 and the second back pressure chamber 25 are connected. Accordingly, the pressure of the fluid in the second flow path 12a is applied to the surface 41a, which faces the first back pressure chamber 21, of the first valve element 41 and the surface 42a, which faces the second back pressure chamber 25, of the second valve element 42, and the pressure applied to the surface 41a and the pressure applied to the surface 42a can be canceled. When the valve rod 30 is shifted toward the second back pressure chamber 25, the first valve chamber 22 communicates with the first back pressure chamber 21, the first valve chamber 22 is separated from the intermediate chamber 23 by the first valve element 41, the second valve chamber 24 communicates with the intermediate chamber 23, and the second valve chamber 24 is separated from the second back pressure chamber 25 by the second valve element 42. The valve rod 30 has the pressure equalizing path 31 through which the first back pressure chamber 21 and the second back pressure chamber 25 are connected. Accordingly, the pressure of the fluid in the first flow path 11a is applied to the surface 41a, which faces the first back pressure chamber 21, of the first valve element 41 and the surface 42a, which faces the second back pressure chamber 25, of the second valve element 42, and the pressure applied to the surface 41a and the pressure applied to the surface 42a can be canceled. Thus, the force required to shift the valve rod 30 can be small, and the connections between the first flow path 11a and the third flow path 13a and between the second flow path 12a and the third flow path 13a can be switched with a small force.

The embodiment of the present invention is described above. The present invention, however, is not limited to the embodiment. Embodiments obtained by appropriately adding, removing, or modifying components according to the embodiment described above by a person skilled in the art, and an embodiment obtained by appropriately combining features of the embodiment are included in the scope of the present invention without departing from the spirit of the present invention.

REFERENCE SIGNS LIST

1 . . . flow path switching valve, 5 . . . valve body, 10 . . . valve housing, 11 . . . first tubular portion, 11a . . . first flow path, 12 . . . second tubular portion, 12a . . . second flow path, 13 . . . third tubular portion, 13a . . . third flow path, 14, 15 . . . lid member, 21 . . . first back pressure chamber, 22 . . . first valve chamber, 23 . . . intermediate chamber, 24 . . . second valve chamber, 25 . . . second back pressure chamber, 26 . . . first back pressure chamber side valve seat, 27 . . . second back pressure chamber side valve seat, 28 . . . first valve seat, 29 . . . second valve seat, 30 . . . valve rod, 30a . . . upper end portion, 31 . . . pressure equalizing path, 31a . . . first end, 31b . . . second end, 32 . . . longitudinal path, 33 . . . transverse path, 41 . . . first valve element, 41a . . . surface facing first back pressure chamber, 42 . . . second valve element, 42a . . . surface facing second back pressure chamber, 50 . . . drive unit, 51 . . . can, 52 . . . attractor, 53 . . . plunger, 54 . . . coil member, 54a . . . bobbin, 54b . . . coil, 55 . . . compression coil spring, L . . . axis

The invention claimed is:

1. A flow path switching valve comprising:
a valve body in a cylindrical shape;
a valve rod disposed in the valve body in an axial direction;
a first valve element attached to the valve rod; and
a second valve element attached to the valve rod,
wherein the valve body includes a first back pressure chamber, a first back pressure chamber valve seat, a first valve chamber, a first valve seat, an intermediate chamber, a second valve seat, a second valve chamber, a second back pressure chamber valve seat, and a second back pressure chamber in sequence in the axial direction,
wherein the valve body includes a first flow path connected to the first valve chamber, a second flow path connected to the second valve chamber, and a third flow path connected to the intermediate chamber,
wherein the first valve element is disposed in the first valve chamber,
wherein the second valve element is disposed in the second valve chamber,
wherein when the valve rod is shifted toward the first back pressure chamber, the first valve element contacts the first back pressure chamber valve seat, the first valve chamber communicates with the intermediate chamber, the first valve chamber is separated from the first back pressure chamber by the first valve element, the second valve chamber communicates with the second back pressure chamber, the second valve element contacts the second valve seat, the second valve element is separated from the second back pressure chamber valve seat, and the second valve chamber is separated from the intermediate chamber by the second valve element,
wherein when the valve rod is shifted toward the second back pressure chamber, the first valve chamber communicates with the first back pressure chamber, the first valve element contacts the first valve seat, the first valve element is separated from the first back pressure chamber valve seat, the first valve chamber is separated from the intermediate chamber by the first valve element, the second valve chamber communicates with the intermediate chamber, the second valve element contacts the second back pressure chamber valve seat, and the second valve chamber is separated from the second back pressure chamber by the second valve element, and
wherein the valve body or the valve rod has a pressure equalizing path through which the first back pressure chamber and the second back pressure chamber are connected.

2. The flow path switching valve of claim 1, wherein each of the first valve element and the second valve element is cylindrically shaped with flange portions extending outward at both ends thereof.

3. The flow path switching element of claim 2, wherein each of the first valve element and the second valve element are made of a synthetic resin or a rubber material.

4. The flow path switching element of claim 1, wherein
when the valve rod is shifted toward the first back pressure chamber, the second valve chamber communicates with the second back pressure chamber through a space between the second valve element and the second back pressure chamber valve seat, and
wherein when the valve rod is shifted toward the second back pressure chamber, the first valve chamber communicates with the first back pressure chamber through a space between the first valve element and first back pressure chamber valve seat.

\* \* \* \* \*